United States Patent [19]
Pakhchyan et al.

[11] Patent Number: 5,596,371
[45] Date of Patent: Jan. 21, 1997

[54] FILM-MODE VIDEO LINE-DOUBLER MOTION DETECTORS

[75] Inventors: Eduard Pakhchyan, Glendale; Yosif Smushkovich, Santa Monica, both of Calif.

[73] Assignee: DWIN Electronics Inc., Glendale, Calif.

[21] Appl. No.: 382,448

[22] Filed: Feb. 2, 1995

[51] Int. Cl.$^6$ ...................................................... H04N 7/01
[52] U.S. Cl. ........................................... 348/452; 348/911
[58] Field of Search .................................. 348/911, 452, 348/448, 451, 441, 458, 701, 700, 699, 447; H04N 7/01

[56] References Cited

U.S. PATENT DOCUMENTS

| | | | |
|---|---|---|---|
| 4,641,188 | 2/1987 | Dichert | 348/448 |
| 4,876,596 | 10/1989 | Faroudja | 348/450 |
| 4,959,715 | 9/1990 | Prodan | 348/448 |
| 4,982,280 | 11/1991 | Lyon et al. | 348/911 |
| 5,255,091 | 10/1993 | Lyon et al. | 348/443 |
| 5,267,035 | 11/1993 | Weckenbrock et al. | 348/97 |
| 5,291,280 | 3/1994 | Faroudja et al. | 348/447 |
| 5,347,314 | 9/1994 | Faroudja et al. | 348/448 |

Primary Examiner—Safet Metjahic
Attorney, Agent, or Firm—J. E. McTaggart

[57] ABSTRACT

For large screen video displays using line-doubling to reduce scan line visibility, where a video source signal in standard interlaced format such as NTSC is converted to line-doubled non-interlaced format for progressively scanned display, visible motion degradations such as edge shimmer and strobe effects due to film-sourced video material are minimized by improved motion-detection video processing taught by this invention. In advance of actual display, successive fields are monitored for motion value in a first motion-detector and microprocessor comparator/analyzer where fields having high field-motion-value are detected as H-fields. Then, for display, each H-field is modified by pixel-averaging with a selected non-H-field. The regular and averaged fields are correctly sequenced to achieve vertical pixel alignment and smooth motion transitions thus minimizing film-source edge motion degradation. Film-mode entry and exit are accomplished automatically in a second motion-detector-analyzer that accomplishes fast film/video recognition and mode-switching. Film-mode entry and exit are each accomplished within a time period of one field, several times faster than in known art; such fast entry and exit are particularly important in avoiding visible motion defects under worst case conditions where regular video material is fragmented by frequent and/or non-synchronous spliced insertions of film-sourced or computer-generated portions.

14 Claims, 5 Drawing Sheets

FILM-MODE VIDEO LINE-DOUBLER MOTION DETECTORS

FIELD OF THE INVENTION

The present invention is in the field of video and television, and more particularly the field of large screen displays where a standard input video signal, e.g. NTSC, formatted for interlaced scan, is converted to a line-doubled non-interlaced format for progressive scanning at a doubled scan rate. The invention is directed to motion-detection as applied to two aspects of line-doubled video processing optimized for video input material containing pull-down film-sourced segments: field-motion enhancement and film/video mode switching.

BACKGROUND OF THE INVENTION

In high quality large-screen television displays, the visibility of the scanning line structure can be reduced by scan line multiplication, e.g. line-doubling. In the well known standard NTSC system, alternate 60 Hz fields having 262.5 lines are interlaced 2:1 to provide 525 line vertical resolution in 30 Hz frames; conventional interlaced scanning has proven to be susceptible to motion artifacts and other anomalies at the 30 Hz frame rate, especially with large screen displays.

By doubling the scan rate, the scanning can be made non-interlaced, i.e. progressively scanned, and the frame rate doubled to 60 Hz so that each field constitutes a complete 525 line frame. Additional integer multiplication can be utilized to further disguise the scanning line structure. Such line multiplication tends to accentuate the motion deficiencies inherent in the original interlaced format, e.g. strobe effects, shimmer and jaggedness along the edges of moving objects; thus further processing is required to obtain smoother displayed motion through timing correction.

Such correction typically involves separating the luminance (Y) from the chrominance (C) with a comb filter and motion-processing at least the luminance portion utilizing circuitry including delay means to provide successive fields of Y data for comparison and interpolation. Integrated circuit application data published by NEC Corporation, Japan describes Y/C separation and motion detection in connection with IC product uPD9380 and describes Y-C interpolation in connection with uPD9382. Scan conversion including Y signal separation and data interpolation techniques are described in connection with uPD41101/uPD41102 digital delay lines.

Transfer of film to videotape has been performed for many years using an artifice known as pulldown, where a difference between the film frame rate and a higher video frame rate is reconciled by using successive film frames for two and three video fields respectively. Film with a frame rate of 24 per second is transferred to NTSC video (60 interlaced 262.5 line fields/30 525 line frames per second nominal) using 3/2 pulldown: every odd film frame is encoded in two fields, i.e. shown twice, and every even frame is encoded in three fields, i.e. shown three times. Without special compensation, there will be unwanted anomalies appearing on edges of moving images.

With line multiplication, the motion-processing required for film-sourced video is substantially different than that required for normal video (e.g. video camera) sources, so generally two separate motion-processors are required. Thus a line-doubler to be used with a mixture of standard video material and film-originated material needs to be able to operate in either of two motion-processing modes: a normal video mode and a film mode. Selecting between these two modes requires motion-detection circuitry that can quickly recognize the beginning and end of film material inserts and control automatic film mode entry and exit.; however, in known art, film-mode entry is prolonged excessively due to the time required for the film-mode processor to acquire synchronization after film-sourcing has been detected.

High quality doubled video display requires the reaction time period required to accomplish such mode-detection and mode-switching needs to be made as short as possible for both entry and exit in order to suppress motion-artifacts appearing at moving image edges during the transition periods. This is particularly important when dealing with source material that was originally transferred from film to video in a pull-down process then edited electronically such that the film/video field pattern is highly fragmented and spliced, often in a non-synchronous manner. Film-video mode detectors and controllers in line multiplication systems of known art fail to react and re-synchronize quickly enough, and thus show shimmering and raggedness at the edges of moving objects during film mode entry and exit transitions.

DESCRIPTION OF KNOWN ART

As an example of line-doubled video processing to eliminate undesirable edge motion shimmering associated with video images that have originated from 3/2 film transfer, U.S. Pat. No. 4,876,596 to Faroudja discloses an "Improved Film to Video Converter with Scan Line Doubling"; while this processing approach can avoid unwanted spatial artifacts associated with film-sourced video once the system has become synchronized and runs continuously, Faroudja acknowledges the problem of determining "the alpha and beta sequences", and, as opposed to motion analysis at the receiver as taught in the present invention, Faroudja elects to "include a sequence control marker and a segment ID marker in the television signal as part of the film-to-video process", for which are provided an NTSC decoder (44, FIG. 1) and related sequencer control circuitry. In this aspect, the Faroudja invention would require non-standard television broadcast transmission, and is thus inoperable from all presently standard television transmissions since the required special encoded markers are not transmitted.

U.S. Pat. No. 4,982,280 to Lyon et al discloses a motion sequence pattern detector for recognizing film-sourced video from periodic recurrences of the pattern nMMMM of motion sequences within a succession of 5 video fields, where n represents "no motion" and M represents "motion". The response time of this system for film mode entry is typically 15 fields (0.25 second) following the start of a film mode segment, and the exit time is 5 fields (0.083 second). Motion artifacts would be visible during these entry and exit response time periods.

FIG. 1 is an overall block diagram of a scan line doubler that is generally representative of known art. An input video luminance signal Y0 is replicated by Y1 which is delayed by one field in delay circuit 10A and by Y2 which is delayed by one additional field in a second identical series-connected delay circuit 10B. Signals Y0, Y1 and Y2 are processed through FIFO (first-in-first out) time-compressors 12A, 12B and 12C respectively for scan-doubling, i.e. horizontal line double speed conversion; their outputs are applied to a multiplexer 14 which is under control of a sequencer 16, which receives as input the signals Y0, Y1 and Y2 delayed by 0, 1 and 2 fields respectively.

The one-field delay circuits 10A, 10B and the time compressors 12A, 12B and 12C are typically implemented as digital circuitry, so that where the video source is analog, an A/D converter, typically 8 bit, would be required to provide digital signal input (YO). Multiplexer 14 can be implemented with either digital or analog circuitry; for analog multiplexing, a D/A converter would be required at each signal input port of multiplexer 14.

The processing in sequencer 16 and multiplexer 14 is critical to the quality of motion reproduction in the displayed image; processing that is optimal for regular video, e.g. from a camera where motion is smooth and continuous, is unsatisfactory for film-sourced video because the motion forms a discrete pattern having discontinuities due to field-to-field anomalies inherent in pull-down film-to-video transfer. Since two separate modes are required, a film mode and a regular video mode, mode-selection may be provided by the additional components shown in dashed lines: a SPDT output switch 18 selects between first and second line-doubled signals Y' and Y", derived from two different processing modes. Such switching may be made automatic by actuating switch 18 by a control signal F/V from sequencer 16 as shown. As discussed above, the mode-switching response time, as addressed by the present invention, is particularly critical in the presence of spliced film-sourced fragmentation of the incoming video signal.

OBJECTS OF THE INVENTION

It is a primary object of the present invention to provide a line-doubling video processing mode operating from a logic protocol that is fully optimized for film-sourced video and that minimizes visible motion degradation attributable to the original film-to-video pull-down transfer process.

It is a further object to provide capability in the line doubler system for quickly detecting start and finish points of film-sourced portions spliced between regular video portions, and accordingly switching between a regular video mode of known art and the film mode according to the present invention.

It is a further object to accomplish each event of such detecting and mode-switching in an unprecedented response time, not exceeding one scan field (i.e. 16.66 milliseconds at 60 HZ scan rate) for entering or exiting the film mode, regardless of whether the splicing is synchronous.

It is a further object to provide a film mode line doubler including a film/video mode-controller, that can be economically produced from commercially available electronic components and readily incorporated with an existing line-doubled video display system.

In connection with the above objects, it is an overall object to provide motion detector circuitry that detects pixel level movement values, sums and accumulates absolute movement values over each field time duration, quantifies the field motion values, and detects fields having a high motion value indicative of film-sourcing.

SUMMARY OF THE INVENTION

FIG. 2 is a simplified overall block diagram of a line doubler system in accordance with an embodiment of the present invention, providing novel implementation of the functions of sequencer 14 and multiplexer 16 of FIG. 1; these are replaced by multiplexer 14A of FIG. 2 containing novel motion detection circuitry and logic for processing film-sourced video in an automatically synchronized manner that achieves the objects of the invention as stated above. In comparison with FIG. 1 there is one additional field delay 10C and time compressor 12C. Sequencer 16 along with input lines Y0, Y1 and Y2 of FIG. 1, are eliminated. The four time-compressed signals 2Y0–2Y3 are converted by D/A converters 22A–22D to analog signals A2Y0–A2Y3 that are applied as input to multiplexer 14A.

The output signal Y' is reconstructed primarily from the one-field-delayed signal 2Y1 and the two-field-delayed signal 2Y2 and therefore Y' is delayed by about two fields relative to input Yin compared to about a one field delay introduced by the prior art system of FIG. 1: this additional one field delay, which is of no significant operational consequence or detriment, allows the present invention to achieve superior motion performance through a form of "preview" motion detection and analysis.

Multiplexer 14A comprises motion detectors of the present invention wherein picture information from two successive fields are subtracted on pixel basis to obtain motion difference values. These are converted from signed differences to unsigned absolute values; these are summed and accumulated over each field duration providing a field-motion signal that is quantized and analyzed digitally in a microcontroller for the occurrence of anomolous high-motion fields according to programmed criteria.

Two similar motion detectors are utilized: in the first motion detector, which performs field-averaging motion enhancement, each field of the signal is in effect previewed before display and analyzed for absolute pixel motion values, which are converted to absolute (i.e. unsigned) values, summed, accumulated and quantized for each field. The motion detector is programmed to detect H-fields, i.e. fields having abnormally high motion value indicative of discrete motion patterns, e.g. from computer animation, or from film pull-down transfer where one of every three fields is an H-field. When an H-field is detected it is modified, for display in the next field period, by averaging it at the pixel level with an appropriate neighboring regular field (non-H-field). This results in smoother film frame progression and minimizes motion degradations of edge shimmer and strobe effects in the display that are inherent in known art methods of scan-doubler processing of film-sourced video, including patents cited above, where film frames are repeated three and four times, whereas in the present invention no frame is repeated more than twice.

The second motion detector performs mode-selection by monitoring and analyzing even- and odd-line signals that have been processed through the above-described field-averaging process. The second motion detector includes a microcontroller portion that is programmed to detect the presence or absence of film-sourced motion in accordance with designated H-field occurrence criteria, and accordingly actuates a video/film mode switch that selects, as the line-doubled video drive source for the display, either an existing video-mode processor or the film-mode processor utilizing motion detection according to the present invention.

Film mode entry and exit via the mode switch are accomplished in the film-mode processor within a response time of one field, even under worst case conditions, e.g. when handling frequent transitions of non-synchronously spliced film-sourced video program segments. This being several times faster than the response of film-source detection/mode-selection systems of known art, the present invention achieves a significant reduction of visible edge motion degradations in the display, particularly when frequent transitions are required as in densely-spliced mixtures of video- and film-sourced material.

A preferred embodiment is disclosed employing a cost-effective combination of analog and digital components in appropriate roles in both of the above-described aspects: two identical field adders are implemented with analog circuitry, and two motion detectors have identical analog portions that perform absolute-conversion, quasi-peak detection, summing accumulation and zero resetting. A microcontroller, receiving a field-motion signal input from the two analog motion detector portions, performs field-motion quantization and field-to-field comparisons thereof, and consequently provides as outputs a field-averaging switch-control signal and a fast film/video mode-control signal.

BRIEF DESCRIPTION OF THE DRAWINGS

The invention is best understood through studying the following descriptions in connection with the accompanying drawings wherein.

DETAILED DESCRIPTION

Figure 2:
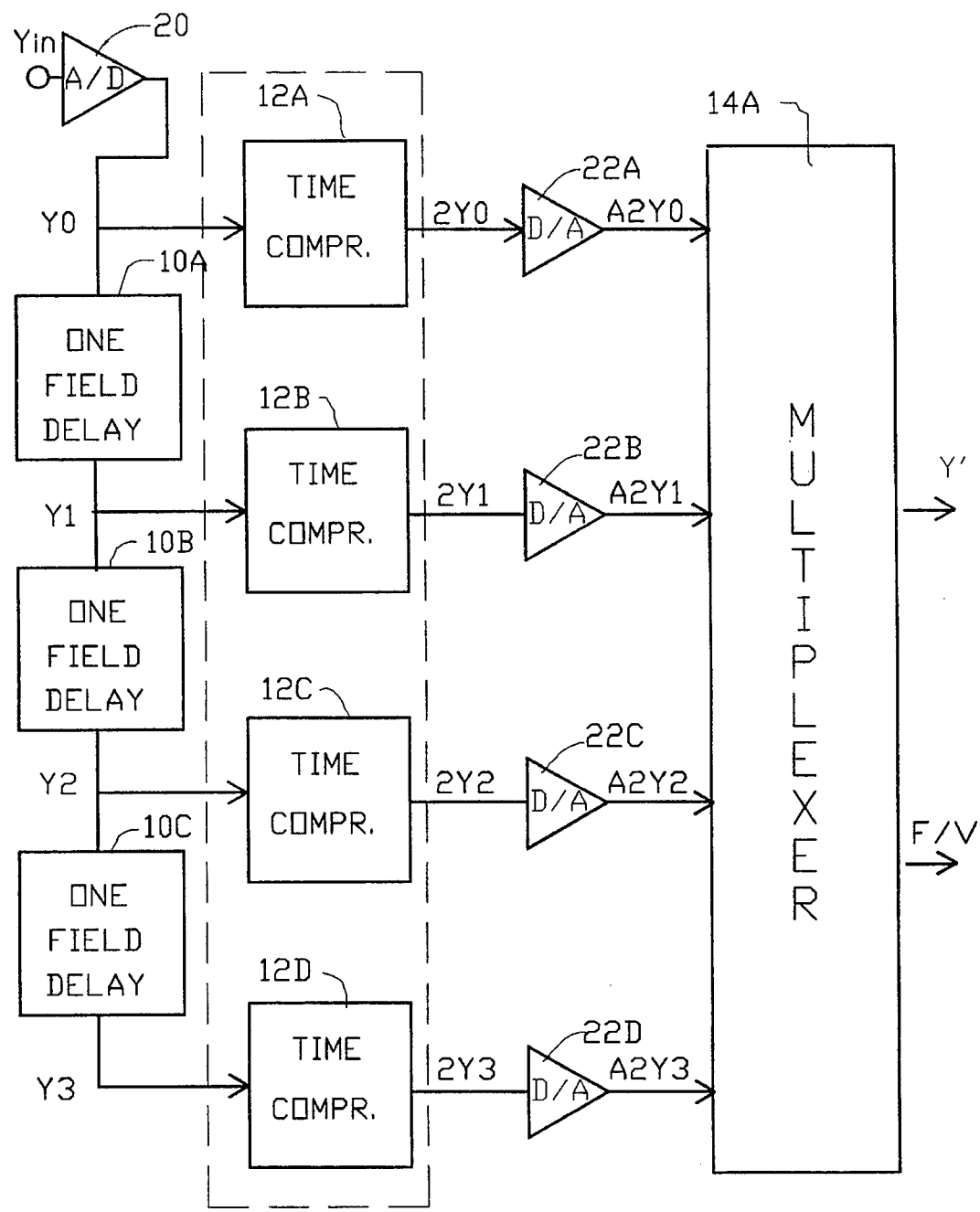
FIG. 2 is a simplified block diagram of a line-doubler system in accordance with the present invention.
Figure 3:
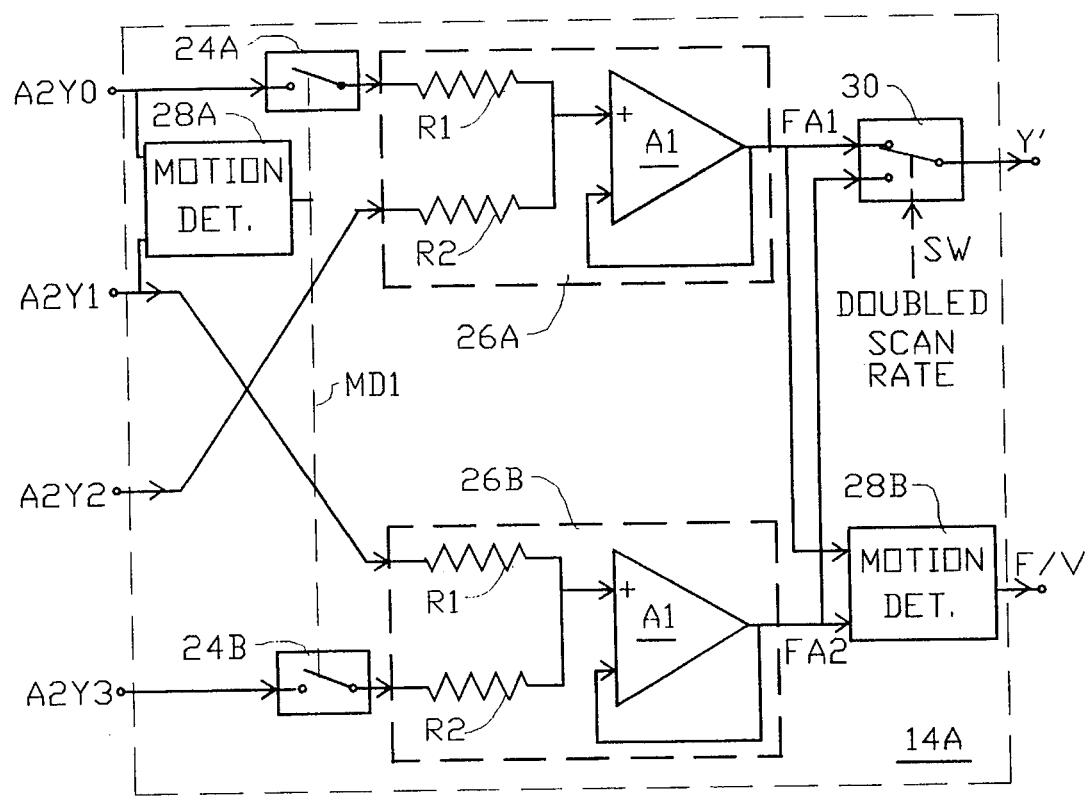
FIG. 3 is a functional block diagram of the multiplexer of FIG. 2 showing analog circuitry schematically.

FIG. 3 is a schematic/block diagram of multiplexer 14A of FIG. 2. The analog signals A2Y0, A2Y1, A2Y2 and A2Y3 (delayed by 0, 1, 2 and 3 fields respectively) are applied as input to multiplexer 14A.

A first field adder 26A receives signal A2Y2 directly and receives signal A2Y0 via switch 24A.

Signals A2Y0 and A2Y1 are applied to respective inputs of a motion detector 28A whose output MD1 controls switches 24A and 24B such that they act together in a DPST mode, opening and closing in response to logic levels 0 and 1 respectively in signal MD1.

A second field adder 26B, identical with field adder 26A, receives signal A2Y1 directly and receives signal A2Y3 via switch 24B.

Signals FA1 and FA2, outputs from field adders 26A and 26B respectively, are applied to input terminals of SPDT selector switch 30, which is actuated continuously at the doubled horizontal scanning rate, thus providing as output the line-doubled progressive-scan video signal Y' with lines from the odd and even fields correctly interleaved.

Figure 1:
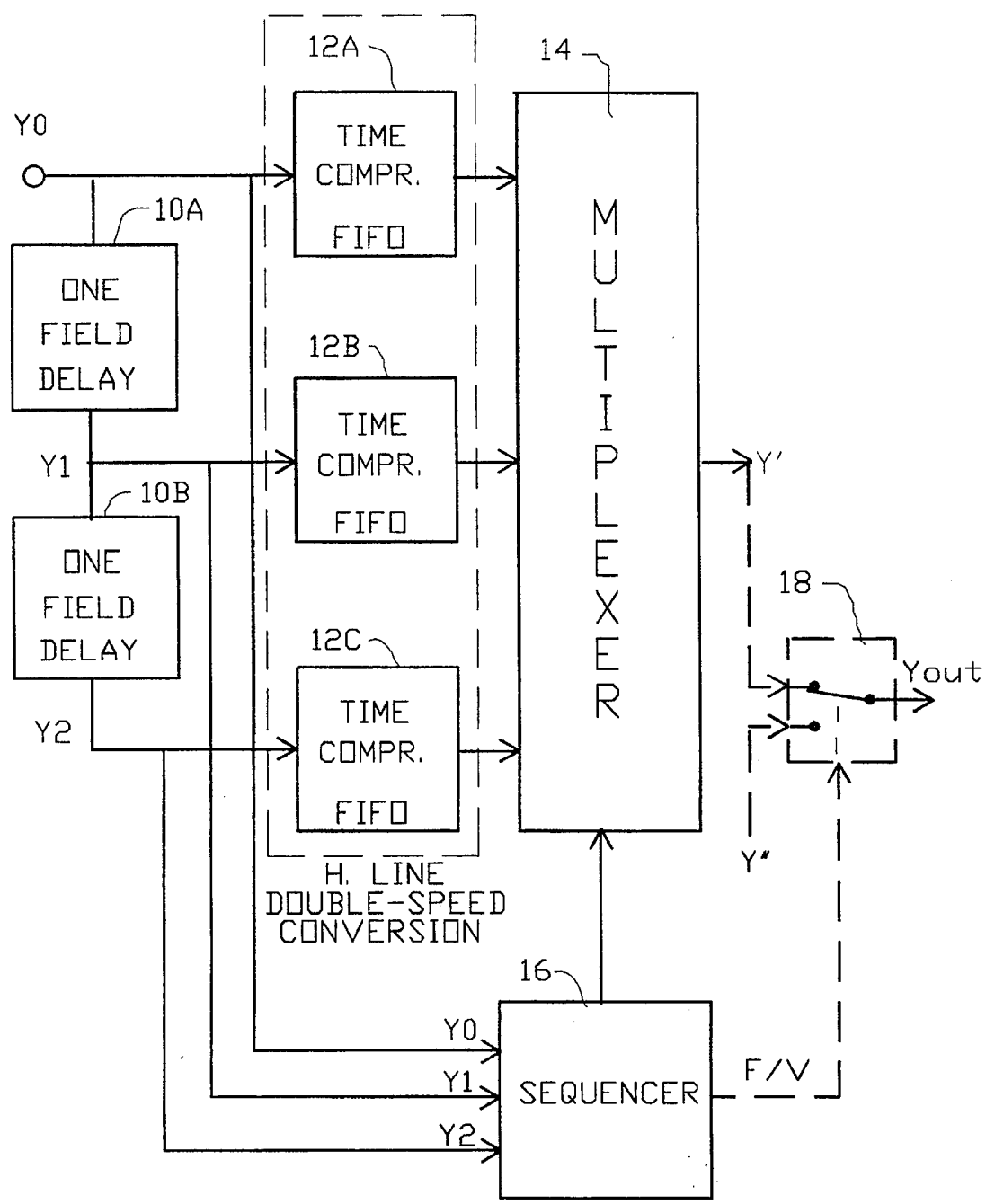
FIG. 1 is a simplified overall block diagram of a basic line-doubler system of known art.

Signals FA1 and FA2 are also applied to the inputs of motion detector 28B which performs film/video identification, providing as output the control signal F/V for actuating a mode-selector switch (e.g. switch 18, FIG. 1) to select between film and video modes for display.

The two field adders 26A and 26B have identical circuitry with op-amp A1 connected as a feedback unity gain buffer. Input resistors R1 and R2 are equal in resistance value and thus form a 2:1 attenuator at each input when switches 24A and 24B are closed; however when switches 24A and 24B are open there is no attenuation at the other input of the op-amp. Thus field adder 26A averages the even fields, i.e. (A2Y0+A2Y2)/2, when switch 24A is closed and transmits A2Y2 alone at full value when switch 24A is open; and similarly field adder 26B averages the odd fields, i.e. (A2Y1+A2Y3)/2, when switch 24B is closed and transmits A2Y1 alone at full value when switch 24A is open.

Figure 4:
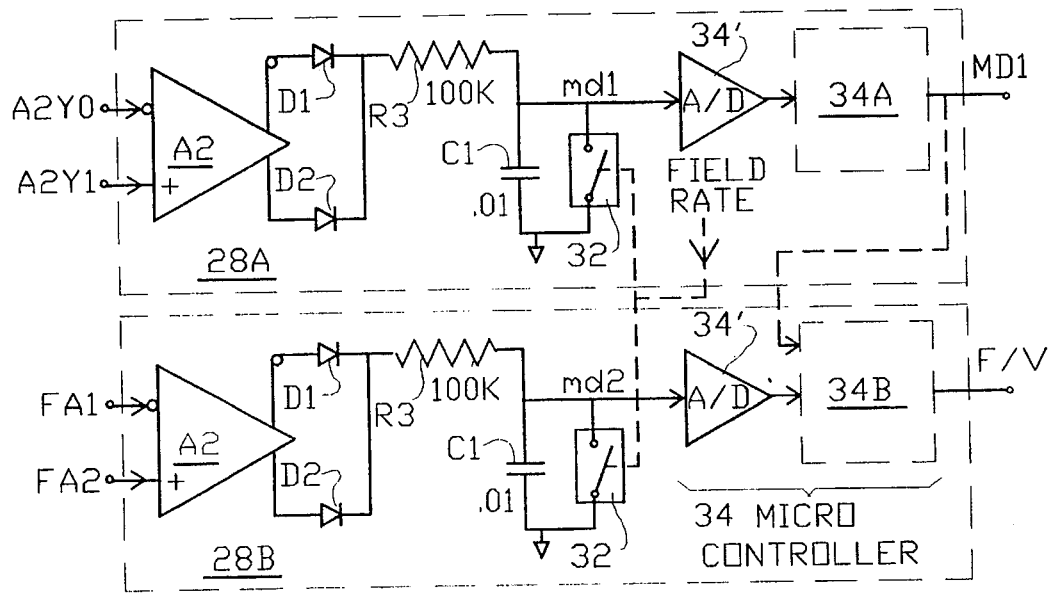
FIG. 4 is a schematic diagram of the motion detectors in the multiplexer of FIG. 3 including analog circuitry and a microcontroller.

FIG. 4 shows a schematic diagram of the circuitry of field motion detector/analyzers 28A and 28B of FIG. 3. The analog portions of these, for which circuitry is shown, are identical: the outputs of a differential amplifier A2 with diodes D1 and D2 form a full wave rectifier, which with 100k ohm resistor R3 provides a quasi-peak detected signal md1 (md2) at capacitor C1, representing an absolute motion value, i.e. any algebraic minus sign is removed. These absolute motion values, md1 and md2, in the form of zero-based ramp waveforms are applied via a pair of A/D converters 34' as input to corresponding sections 34A and 34B of a microcontroller 34. Switches 32 connected across capacitors C1 are pulsed continuously from the microcontroller 34 at the field rate, 60 Hz, so as to discharge capacitors C1 between fields, thus resetting the motion values, md1 and md2, to zero so as to start the ramp waveform of each field uniformly at zero. The amplitude of each ramp waveform is sampled by the microcontroller at a designated slice of time along the waveform so as to obtain a quantitative motion value for the corresponding field. The sampling time slice is typically chosen to be near the high end of the ramp, e.g. at 90% of the ramp duration, however the sampling may be done much earlier, e.g. as early as 5% of the ramp duration or approximately the twentieth scan line, in the second motion detector to accomplish even faster film mode exit performance.

The microcontroller section 34A compares the motion value of each field with that of the previous field: if there is an increase beyond a designated threshold the field is detected as an H-field (high-motion-value field); if there is no detected increase the field is categorized as a non-H-field having a regular motion value. Identification of a non-H-field results in logic 0 at output MD1 during the subsequent field and detection of an H-field results in logic 1 at output MD1 during the subsequent field, actuating field-adder switches 24A and 24B accordingly. The detection threshold in section 34A is set at 1.05, thus an H-field is detected when the motion value is more than 5% above that of the previous field.

Section 34B of microcontroller 34, receiving signals md2 and MD1 as inputs, continuously analyzes md2 and monitors MD1 to control the F/V output. Section 34B is programmed with the following criteria: initially in the video mode, in the absence of detected discrete motion, continuous (at least two fields) absence of H-field detection at md2 causes the output F/V to remain at V, sustaining the video mode. Following detection of an H-field in md1 (i.e. MD1= 1), subsequent detection of a non-H field at md2 will cause the F/V output to immediately transition and switch the system to enter the film mode by actuating the mode switch to drive the display from output Y' of multiplexer 14A. Output F/V will hold at F and sustain the film mode as long as an H-field is detected at MD1 at least once in every three successive fields and no H-fields are detected in the second motion detector 28B. Then upon detection of an H-field in the second motion detector 28B, the output F/V will transition to V, actuating the mode switch (e.g. switch 18 FIG. 1) to immediately exit from the film mode.

In an alternative implementation, section 34B can be made to receive md1 as input instead of MD1, with appropriate programming to accomplish the above-described operation and result.

Figures 5, 6:
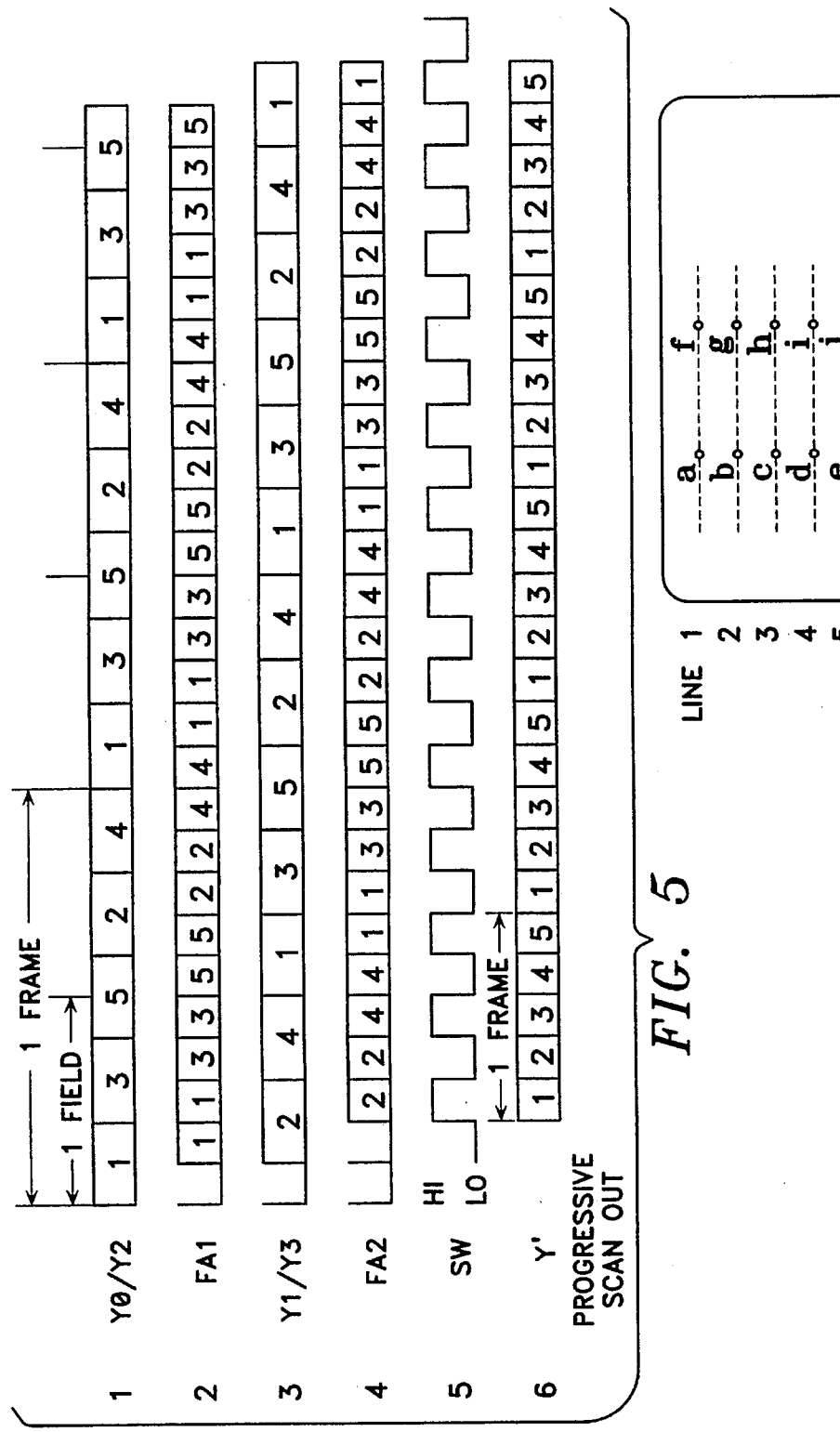
FIG. 5 is a timing diagram showing the line/field relationships of signals Y0-Y3, FA1-2, SW and Y' for basic operation of scan-line-doubling, referencing FIGS. 2 and 3.
FIG. 6 is shows five successive scan lines and a field motion value equation in connection with the operation of the motion-detection multiplexer of FIGS. 3.

FIG. 5 is a timing diagram of the scan-line-doubling process showing the relationship of signals Y0–Y3 from FIG. 2 and signals FA1, FA2, SW and Y' from FIG. 3. In the presence of motion and/or film sourcing, activation of motion detector 28A will result in field-averaging of Y0 with Y2 and Y1 with Y3 as explained below in connection with FIG. 7. However, in a basic condition where the signal source is regular video (not film-sourced) and is virtually motionless, the system operates in the V (video) mode with motion detectors 28A and 28B remaining inoperative and holding switches 24A and 24B open so that FA1 replicates A2Y2 and FA2 replicates A2Y1. In either case, a line-doubled signal Y' is generated continuously at the output of multiplexer 14A, however this is selected for display only when motion detector 28B detects film-mode sourcing, otherwise switch 28B remains in the V mode where the output control signal V selects the output signal from the main system line-doubler for viewing, e.g. via switch 18, FIG. 1.

For illustrative purposes regarding FIG. 5, the source signal (Yin, FIG. 2) is assumed to have an interlaced format with five lines per frame, i.e. 2 ½lines per field.

Rows 1 and 3 of FIG. 5 show the timing and sequences of numbered scan lines and field/frame relationships of signals Y0/Y2 and Y1/Y3 respectively.

Rows 2 and 4 show the corresponding timing and sequences of at FA1 and FA2, the outputs of field adders 26A and 26B respectively.

Row 5 shows the waveform of control signal SW: a square wave at the doubled scan rate applied to switch 30.

Row 6 shows the output signal Y' as commutated by switch 30 selecting FA1 and FA2 alternately. In this progressively-scanned (non-interlaced) scan-line-doubled output luminance signal Y', each field is a complete frame, the scan rate and the frame rate have been doubled, and the output scan lines are seen to be in correct progressive sequence: 1 2 3 4 5.

FIG. 6 shows vertical pixel alignment in five successive lines that are progressively-scanned lines as in the doubled video output Y' of the multiplexer 14A of FIG. 3 and shown at row 6 of FIG. 5. The accumulated absolute field motion value associated with the operation of motion detectors 28A and 28B in FIG. 3 is defined by the equation: field motion value=$[a-b]+[f-g]+[c-b]+[g-h]+[c-d]+[h-i]$... etc., taken over the time duration of a field.

Figure 7:
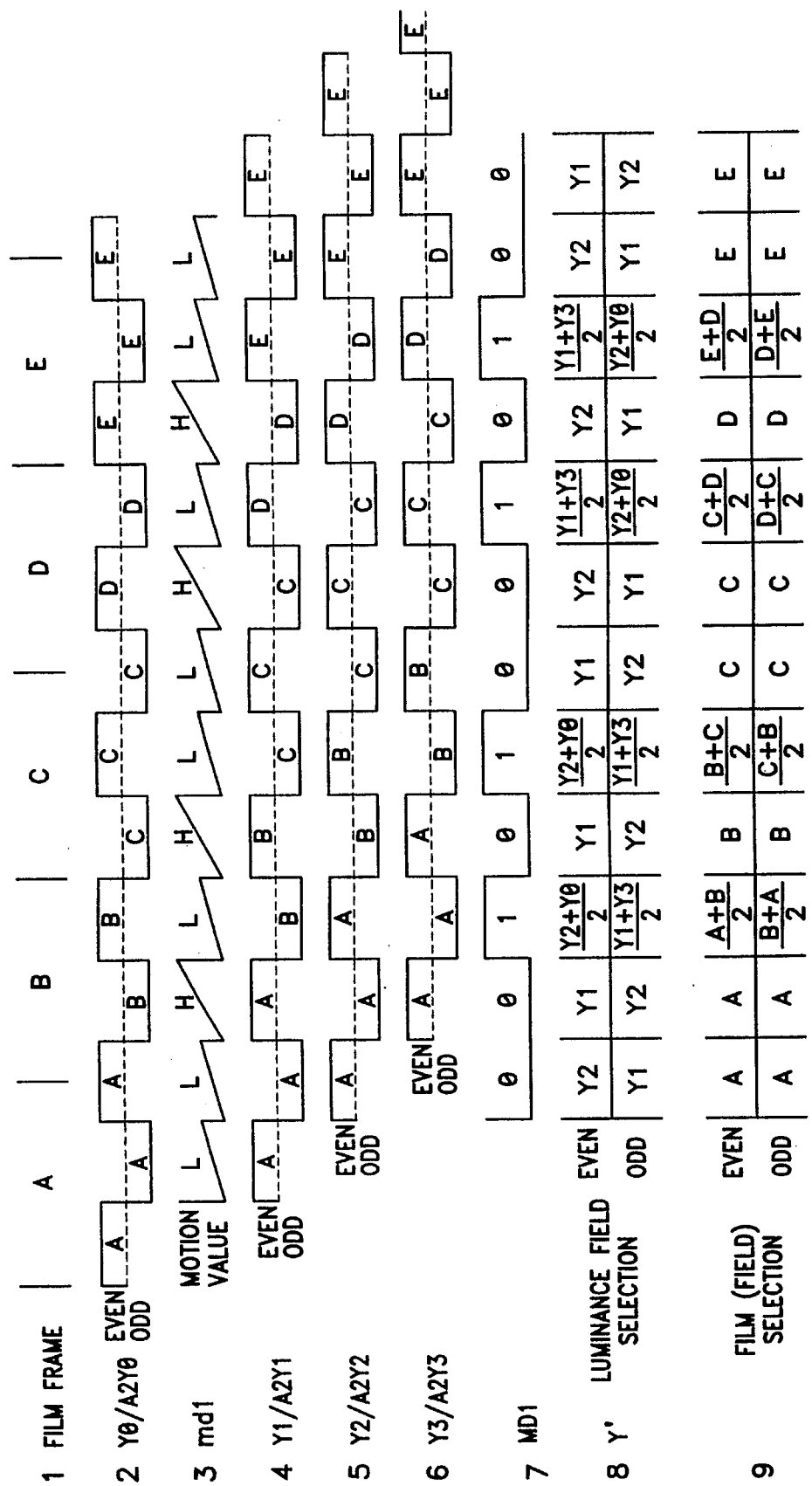
FIG. 7 is a timing diagram of the motion-detecting multiplexer of FIG. 3 operating in the film mode, showing the processing and field selection sequences for five successive film frames.

FIG. 7 is a timing diagram illustrating the film-mode processing of a series of five successive original film frames A–E in the multiplexer 14A (FIG. 3) of the present invention, including the field-selection process that provides the motion-enhanced output luminance signal Y'.

Row 1 shows five original film frames A through E.

Row 2 shows the undelayed signal A2Y0/Y0 with even and odd fields from the original film-sourced interlaced video signal. The 3/2pulldown relationship with row 1 is evident: three A's, two B's, three C's, two D's.....etc.

Row 3 shows the motion value ramp waveform md1 developed by analog portion of the first motion detector 28A. The amplitude of the ramps will vary according to amount of motion present as well as on the video content, reaching minimum when two successive fields are identical, i.e. black or white, and going to maximum if two successive fields are totally different, e.g. black and white. As a feature of the present invention, the influence of such unwanted fluctuations is eliminated by detecting H-fields by field-motion-value comparison with the previous field on the basis of requiring a predetermined relative increase in absolute motion value that is indicative of film-sourcing or other discrete motion irregularities.

Under a still or low-motion picture condition regardless of whether the incoming signal is film or video sourced, the amplitude of md1 would remain below the detection threshold, no H-fields would be detected and thus every field motion value along row 3 would be L, and the system would operate in the video mode.

With regular video sourcing, motion is characteristically continuous and the absence of vertically aligned pixels in the successive interlaced video fields (H fields detected at md1) will repeat for md2 delayed by one field, thus the system will remain in the video mode.

When film-sourced material appears in the incoming signal, md1, H-fields will be detected from md1 as shown in row 3 where one in every three fields is detected as an H-field, and continuous L-fields will be detected at md2, thus the system will enter the film mode after an H-field is detected at md1 and the subsequent field at md2 is a non-H-field. After entering the film mode, the H-field detection threshold may be increased to 50% to prevent any unnecessary exit from film mode during scene changes.

Row 4 shows the one-field delayed signal A2Y1/Y1: subtracting A2Y0–A2Y1 in the first motion detector 28A yields a low motion value L in md1 if A2Y0 and A2Y1 are both from the same film frame, but yields a higher value H in md1 if they are from different frames.

Row 5 shows the incoming two-line-delayed signal A2Y2/Y2.

Row 6 shows the incoming three-line-delayed signal A2Y3/Y3.

Row 7 shows signal MD1, the final output of motion detector 28A, delivered by microcontroller section 28A' which is made to act on md1 (row 3) according to the following rule: whenever md1 is L the subsequent field in output MD1 (row 7) is logic 0, and whenever md1 is H, the subsequent field in output MD1 is logic 1.

Row 8 shows how the output luminance signal Y' in progressive scan format is reconstructed by commutative switch 30 (FIG. 3) which recombines the even field-averaged signal FA1 and the odd field-averaged signal FA2 in alternating field sequence.

Row 9 shows film-mode field selection corresponding to row 8. It is seen that the odd and even fields are sequenced identically, thus picture information will be in vertical alignment, and that one out of every three fields are now averaged in replacement of the corresponding high-motion transitional fields indicated in row 3.

The process of FIG. 7 goes on continuously, restarting automatically by switching at MD1 on a first indication of a film-sourced segment so that synchronization is always automatic and complete ready for display at the instant of mode detection and mode switching execution.

In implementing the microcontroller 34 in the present invention, a commercially available microcontroller may be utilized, e.g. Siemens type SAB80535, which includes the required a/d converters 34' at the input ports.

The principles involved in the embodiment shown are applicable to scan-multiplication by integers other than 2.

The choice between analog and digital circuitry for particular portions of the circuitry is a matter of design choice based on technology availability and cost.

The operation as described for luminance signals could be readily applied to motion detection and enhancement of chroma signals.

The process of motion detection taught by the present invention can be applied to the aspect of field-averaging enhancement independent of the mode-selection aspect.

The invention may be practiced with motion value criteria other than examples given as illustrative and with other variations that are matters of design choice within a working range.

The embodiment described is suited to operation from NTSC 525 line 30 Hz frame rate and PAL/SECAM 625 line 25 Hz frame rate standards, and film-to-video transfers from 24, 25 or 30 Hz frame rate to any of the foregoing standards as well as computer-generated (graphic animation) video sources. The principles of the invention are also adaptable to other television/video standards.

The invention may be embodied and practiced in other specific forms without departing from the spirit and essential characteristics thereof. The present embodiments therefore are considered in all respects as illustrative and not restrictive. the scope of the invention is indicated by the appended claims rather than by the foregoing description. All variations, substitutions, and changes that come within the meaning and range of equivalency of the claims therefore are intended to be embraced therein.

What is claimed is:

1. An improved video motion detector system in a film-mode processor of a video signal scan-line-doubler processing system wherein an input video signal having a standard interlaced format is time-compressed and further pocessed to provide a doubled signal in non-interlaced format for driving a high quality video display, the film-mode processor being dedicated to processing of the time-compressed signal in an optimal manner with regard to displayed motion quality when operating from source material originally transferred from film in a pull-down process, said motion detector system comprising:

a differential amplifier, receiving s differential input the pair of successive fields of time-compressed signals, constructed and arranged to instantaneously subtract vertically-aligned pixel data of each pair of successive fields of the time-compressed video signal so as to derive a difference signal representing successive algebraically-signed pixel difference values, and to provide, as differential output at a pair of output nodes, the algebraically-signed difference signal;

a full-wave quasi-peak rectifier, comprising a pair of diodes, receiving as input the algebraically-signed difference signal from said differential amplifier constructed and arranged to convert the pixel difference values to unsigned absolute pixel motion values;

integrating means, comprising a capacitor being periodically charged from said rectifier through a series resistor, receiving as input the unsigned absolute pixel motion values, constructed and arranged to accumulate the absolute pixel motion values during each video field active time so as to provide a field-motion signal having a ramp waveform representing absolute pixel motion values as summed and accumulated during each field period;

zero-setting means constructed and arranged to recurrently discharge the capacitor during each vertical retrace period so as to cause each ramp occurrence in the ramp waveform to start at zero voltage;

quantizer/comparator means, receiving as input the ramp waveform, constructed and arranged to convert each ramp occurrence in the field-motion ramp waveform to a quantitative field-motion value and to compare successive pairs of the field-motion values in a manner to detect H-fields having high field-motion value according predetermined criteria;

a microcontroller in said quantizer/comparator means, receiving as input the field-motion ram waveform constructed and arranged to sample each ramp occurrence at a predetermined time segment of the ramp, provide therefrom a corresponding field-motion value, compare each field-motion value with that of a most recent previous field, and accordingly detect H-fields defined as having a field-motion value that exceeds that of the previous field by more than a predetermined margin, and to provide a binary field-selection control signal delivering logic "1" for a time period of one field following each detected H-field and delivering logic "0" for a time period of one field following each non-H-field, i.e. each field not detected as an h-field.

2. The video motion detector system as defined in claim 1, augmented to provide film-field-averaging enhancement, wherein the scan-rate doubler processing system is made to provide, in scan-line-doubled format replicating the incoming video source material, an undelayed signal, a one-field-delayed signal, a two-field delayed signal and a three-field delayed signal, said system comprising, as a key element in film-field-averaging circuitry of the film-mode processor, a first motion detector configured according to the system as defined in claim 7, receiving as inputs the undelayed signal and the one-field-delayed signal, said system further comprising in the film-field-averaging circuitry:

a first SPST field-adder switch receiving as input the undelayed signal, receiving as a control input signal the binary field-selection control signal from said microcontroller, and providing as output an undelayed switched signal;

a second SPST field-adder switch receiving as input the three-field-delayed signal, receiving the control signal from said microcontroller, and providing as output a three-field-delayed switched signal;

a first field-averaging-adder receiving as inputs the two-field-delayed signal and the undelayed switched signal, providing as output an even film-field-averaged signal;

a second field-averaging-adder receiving as inputs the one-field delayed and the three-field-delayed switched signal, providing as output an odd film-field-averaged signal;

a SPDT commutator switch, receiving as inputs the even and odd film-field-averaged signals, actuated at twice the source scan rate so as to combine the even and odd film-field-averaged signals in an interleaved manner so as to thus provide, for driving the display, a doubled video signal that is enhanced for film-sourced video by field-averaging such that each detected H-field is averaged with a selected non-H-field;

whereby field-to-field motion in displayed images is smoothed so that edge motion degradations and strobe effects are minimized.

3. The video motion-detector system as defined in claim 2 wherein said first and second field-averaging-adders each comprise:

a first input port receiving a corresponding signal supplied from a low impedance source;

a second input port receiving a corresponding switched signal supplied from a low impedance source via a corresponding one of said field-adder switches;

a buffer device having a high impedance input;

a first resistor connected between the first input port and the buffer input, providing an adder output signal;

a second resistor, equal in resistance to said first resistor, connected between the second input port and the buffer input;

whereby a closed state of the switch results in an output signal from said buffer device that is an instantaneous average of the signals at said first and second input ports, and an open state of the switch results in an output signal that replicates in full only the signal received at said first input port.

4. The video motion-detector system as defined in claim 2, augmented to provide automatic film/video mode selection, further comprising, in a film/video mode-selection portion:

a second motion detector, like said first motion detector, receiving as inputs the first and second film-field-averaged signals, and providing as output a mode-selection field-motion ramp waveform;

a mode-selector portion of said microcontroller, receiving as input the field-motion ramp waveform from said second motion detector, said microcontroller being programmed to detect H-fields in said second motion detector according to mode-selection criteria, to perform predetermined analysis regarding H-field occurrences in said first and second motion detectors so as to quickly identify film-sourcing and accordingly provide as output a binary film-video mode-selection control signal signifying a beginning and an ending of each film-sourced segment for controlling film mode entry and exit with the criteria; and a SPDT display mode switch, actuated from the mode-selection control signal, receiving as selectable inputs a regular doubled video-mode signal and the doubled film-mode signal output in accordance with the present invention, said mode switch delivering a selected one of the inputs as output driving the display.

5. The video motion detector as defined in claim 4 wherein:

said microcontroller is programmed with the following mode-selection criteria:

(a) in the video mode, with a continuous absence of H-fields in the first and second motion detectors for at least a two-field time duration, the mode-control signal remains at logic 0, sustaining the video mode;

(b) in the video mode, following detection of an H-field in the first motion detector and subsequent detection of a non-H-field in the second motion detector the mode-control signal transitions to logic 1, exiting the video mode and entering the film mode;

(c) in the film mode, as long as at least one H field is detected in each three fields in the first motion detector and no H-fields are detected in said second motion detector, the mode-control signal remains at logic 1, sustaining the film mode;

(d) in the film mode, upon detection of an H-field in said second motion detector, the mode-control signal transitions to logic 0, exiting the film mode and entering the video mode.

6. A video scan-line-doubler motion-correction process utilizing field-averaging to minimize edge motion degradation in displaying film-sourced video source material, comprising the steps of:

(a) providing four signals replicating video source material in 2:1 time-compressed form: an undelayed signal, a one-field-delayed signal, a two-field delayed signal and a three-field delayed signal, designated as even, odd, even and odd signals respectively;

(b) providing the undelayed signal and the one-field delayed signal as inputs to a first motion detector performing steps (c) through (h);

(c) instantaneously subtracting vertically, aligned pixel data of successive fields of the time-compressed signals so as to derive algebraically signed pixel-motion values;

(d) converting the signed pixel-motion values to unsigned absolute pixel motion-values;

(e) summing and accumulating the absolute pixel-motion values during a predetermined active period of each field so as to derive a field-motion signal representing a cumulative summation of absolute pixel-motion values within each field period;

(f) deriving a quantitative field-motion value for each field in a predetermined manner from the field-motion signal;

(g) comparing each current field-motion value with that of a most recent previous field in a manner to detect H-fields defined as having a field-motion value exceeding that of the previous field by a predetermined factor;

(h) generating a binary detected-motion control signal having logic level 1 during a one-field time interval following each field detected as an H-field and having logic level 0 during a one-field time interval following each field not detected as an H-field;

(i) providing the two-field delayed signal to a first input of a first field adder and providing the undelayed signal to a second input of the first field adder via a first controllable switch actuated by the binary detected-motion control signal from step (h) so as to modify each even H-field detected in step (g) by averaging two subsequent even fields, delivering as output an even H-field-averaged signal;

(j) providing the one-field delayed signal to a first input of a second field adder and providing the three-field delayed signal to a second input of the second field adder via a second controllable switch actuated by the binary detected-motion control signal from step (h) so as to modify each odd H-field detected in step (g) by averaging two subsequent odd fields, delivering as output an odd H-field-averaged signal;

(k) combining the even H-field-averaged signal and the odd H-field-averaged signal in a line-interleaved manner utilizing a commutator switch actuated at twice the sourced scan rate so as to thus provide a doubled non-interlaced video signal wherein anomalous field-to-field motion has been smoothed by field-averaging, for driving the display in an optimized film mode.

7. The video motion-detection process as defined in claim 6 further augmented to enable rapid automatic film/video mode-switching to minimize transitional edge motion degradation under signal conditions of frequent and non-synchronous source-mode transitions, e.g. spliced-in film-sourced segments, comprising the further steps of:

(1) applying the even H-field-averaged signal and the odd H-field-averaged signal as inputs to a second motion detector similar to that of step (b);

(m) performing steps (c) through (g) in the second motion detector;

(n) analyzing, in the microcontroller, the occurrence of H-fields detected in the first and second motion detectors in a manner to rapidly recognize film-sourced material and to provide as output a binary film/video mode-control signal for operating a mode selector switch to automatically select between said film-mode processor and a regular video-mode processor as video drive source for the display.

8. The video motion-detection process as defined in claim 7 further comprising in step (n) the substeps of:

(n1) in the video mode, detecting a continuous absence of H-fields in both the first and the second motion detector, and consequently holding the mode-control signal at logic 0, thus sustaining the video mode;

(n2) in the video mode, following detection of an H-field in the first motion detector and subsequent detection of a non-H-field in the second motion detector the mode-control signal transitions to logic 1, exiting the video mode and entering the film mode;

(n3) in the film mode, as long as at least one of every three fields in the first motion detector is detected as an H-field and no H-fields are detected in the second motion detector, the mode-control signal remains at logic 1, sustaining the film mode;

(n4) in the film mode, upon detection of an H-field at the second motion detector, the mode-control signal transitions to logic 0, exiting the film mode and entering the video mode.

9. An improved film-mode video scan-line-doubler processing system wherein an input video luminance signal having a standard 2:1 interlaced format is processed to provide a scan-line-doubled signal in non-interlaced format for driving a high quality video display, the film-mode processor being dedicated to processing of the signal in an optimal manner With regard to displayed motion quality when operating from source material originally transferred from film in a pulldown process, said processing system comprising:

a multiple field delay circuit, receiving as input an undelayed signal derived from the input video luminance signal, comprising three one-field delay devices constructed and arranged in tandem so as to provide as four outputs the undelayed signal, a one-field delayed signal, a two-field delayed signal and a three-field delayed signal;

four 2:1 time-compressing means, receiving as corresponding inputs the four signals from the multiple field delay circuit, constructed and arranged to provide as outputs four corresponding time-compressed signals: undelayed, one-field-delayed, two-field-delayed and three-field-delayed;

a dual mode field-averaging processor, receiving as inputs the four time-compressed signals, constructed and arranged to provide a complementary pair of output signals for recombination, and to operate in and transition between two automatically selected modes: (1) a field-averaging mode wherein one of output signals is caused to be field-averaged from the undelayed time-compressed signal and the two-field-delayed time-compressed signal, and the other output signal is caused to be field-averaged from the one-field-delayed time-compressed signal and the three-field-delayed time-compressed signal, and (2) a non-averaging mode wherein the two outputs are caused to correspond with the one-field-delayed time-compressed signal and the two-field-delayed time-compressed signal respectively;

a first motion detector constructed and arranged to analyze successive fields of video signals with regard to film source characteristics in accordance with predetermined criteria and to accordingly provide a binary control signal to actuate automatic mode selection between the field-averaging mode and the non-averaging mode; and a combining circuit, receiving as two inputs the complementary pair of signals from said field-averaging processor, constructed and arranged to combine the two inputs in a line-interleaved manner so as to thus provide a line-doubled non-interlaced signal which, upon onset of anomalous film-source motion, will become rapidly optimized with regard to such motion by automatic and rapid transition to a field-averaging mode wherein the anomalous motion has been smoothed by field-averaging for driving the video display optimally with regard to film-source-related motion effects.

10. The film-mode video line-doubler processing system as defined in claim 9 wherein said dual mode field-averaging processor comprises:

a pair of signal-interruption switches, receiving as two corresponding signal inputs the undelayed and the three-field-delayed time-compressed signals and receiving in common the binary control signal from the first motion detector, constructed and arranged to respond to a first binary level of the control signal by enabling through-flow of the two signal inputs, and to respond to a second binary level by inhibiting through-flow of the two signal inputs;

first field averaging means, receiving as a first input the undelayed time-compressed signal via said first signal interruption switch and receiving as a second input the two-field-delayed time-compressed signal, constructed and arranged to selectively average the two inputs so as to thus provide as output a first selectively-field-averaged signal; and second field averaging means, receiving as a first input the three-field-delayed time-compressed signal via said second signal interruption switch and receiving as a second input the one-field-delayed time-compressed signal, constructed and arranged to selectively average the two inputs so as to thus provide as output a second selectively-field-averaged signal;

said first motion detector being constructed and arranged to evaluate field-to-field motion, to detect therefrom H fields defined as exhibiting unusually high motion values and to accordingly, upon detection of an H-field, provide the control signal at the first binary level for a subsequent one-field duration in the field-averaging mode, and upon detection of a non-H-field to provide the control signal at the second binary level for a subsequent one-field duration in the non-averaging mode.

11. The film-mode video line-doubler processing system as defined in claim 9 wherein said first motion detector comprises:

a differential amplifier, receiving as differential input the undelayed and the one-field-delayed time-compressed video signals, constructed and arranged to perform subtraction between the two inputs on a field-to-field vertically aligned pixel basis and to provide as differential output, at a pair of output nodes, a corresponding pair of algebraically-signed picture data difference signals;

a full-wave rectifier comprising a pair of diodes each having a like-polarized first terminal connected to a corresponding one of the output nodes of said differential amplifier and each having a second terminal connected to a common rectified node thus forming a full-wave rectifier, a series resistor connected between the common rectified node and a detector output node, and a capacitor connected between the detector output node and a common ground node;

whereby said diodes, said resistor and said capacitor form in combination a full wave quasi-peak detector providing a ramp waveform at the detector output node as a field-motion signal graphically representing absolute pixel motion values that are summed and accumulated during each field period.

12. A film-mode line-doubling process based on field-averaging in a video processing system receiving as input an 2:1 interlaced video luminance signal having at least some time portions that are originated from a film pull-down ratio process, comprising the steps of:

(a) directing the luminance signal through three tandem-connected one-field delays so as to produce an undelayed signal, a one-field delayed signal, a two-field delayed signal and a three-field delayed signal;

(b) separately time-compressing the luminance signal and the three delayed signals by 2:1 so as to produce four time-compressed signals: undelayed, one-field-delayed, two-field-delayed and three-field-delayed;

(c) analyzing the luminance signal and accordingly providing a binary field-averaging control signal having a binary level D during a subsequent field period following a determination that two successive fields originate from two different film frames and a binary level S during the subsequent field period following a determination that the successive fields originate from the same film frame;

(d) during fields demarked by binary level D, providing, as a complementary pair of time-compressed signals to be combined, a first averaged signal comprising the undelayed time-compressed signal averaged with the two-field-delayed time-compressed signal and a second averaged signal comprising the one-field-delayed time-compressed signal averaged with the three-field-delayed time-compressed signal; and during fields demarked by binary level S, providing, as the complementary pair of time-compressed signals, the one-field-delayed time-compressed signal and the two-field-delayed time-compressed signal;

(e) combining the complementary pair of time-compressed signals in a combining circuit in a line-interleaved manner so as to provide a film-mode-optimized line-doubled non-interlaced video signal wherein anomalous field-to-field motion has been smoothed by field-averaging for driving a video display optimally with regard to film-source-related motion effects.

13. The film-mode line-doubling process as defined in claim 12 wherein step (d) is based on motion detection in a first motion detector and comprises the sub-steps of:

(d1) performing subtraction between the undelayed time-compressed signal and the one-field-delayed time-compressed signal on a sequential pixel-to-pixel basis so as to derive a data stream of signed motion values;

(d2) converting the signed motion values to corresponding unsigned absolute motion values;

(d3) summing and accumulating the unsigned absolute motion values within a predetermined active time portion of each field period;

(d4) comparing each current motion value with a most recent previous field in a manner to detect H-fields defined as having a field motion value exceeding that of the previous field by a predetermined factor, thus indicating origination from different film frames; and (d5) generating a binary detected-motion control signal controlling switching means constructed and arranged to accordingly select on an ongoing operational basis between (1) the first and second field-averaged signals and (2) the one-field and the two-field delayed signals, to serve as the complementary pair of inputs to the combining circuit.

14. The film-mode line-doubling process as defined in claim 13 providing the further capability of mode-switching between a film mode and a regular video mode, comprising the further steps of:

(f) applying the first field-averaged signal and the second field-averaged signal as inputs to a second motion detector similar to the first motion detector, and therein performing the steps of:

(f1) performing subtraction between the first field-averaged signal and the second field-averaged signal on a sequential pixel-to-pixel basis so as to derive a data stream of signed motion values;

(f2) converting the signed motion values to corresponding unsigned absolute motion values;

(f3) summing and accumulating the unsigned absolute motion values within a predetermined active time portion of each field period;

(f4) analyzing in computational means the occurrence of H-fields in a manner to rapidly recognize film-sourced material; and (f5) accordingly generating a binary mode-control signal and using the binary mode-control signal to actuate film/video mode selector switching means constructed and arranged to select as signal source for the display, on an ongoing operational basis, between a film-mode optimized signal and a regular video mode signal.

* * * * *